(12) United States Patent
Kuchibhotla et al.

(10) Patent No.: US 8,295,248 B2
(45) Date of Patent: Oct. 23, 2012

(54) SCHEDULING REMOTE UNITS IN WIRELESS COMMUNICATION SYSTEMS

(75) Inventors: Ravi Kuchibhotla, Gurnee, IL (US);
Brian K Classon, Palatine, IL (US);
Robert T Love, Barrington, IL (US);
Ravikiran Nory, Grayslake, IL (US);
Kenneth A Stewart, Grayslake, IL (US);
Yakun Sun, Evanston, IL (US)

(73) Assignee: Motorola Mobility LLC, Libertyville, IL (US)

(*) Notice: Subject to any disclaimer, the term of this patent is extended or adjusted under 35 U.S.C. 154(b) by 1176 days.

(21) Appl. No.: 11/934,172

(22) Filed: Nov. 2, 2007

(65) Prior Publication Data

US 2010/0329128 A1     Dec. 30, 2010

Related U.S. Application Data

(60) Provisional application No. 60/864,328, filed on Nov. 3, 2006.

(51) Int. Cl.
*H04Q 7/00* (2006.01)

(52) U.S. Cl. .................. 370/332; 370/349

(58) Field of Classification Search .......... 370/235, 370/310.2, 328, 332, 333, 349
See application file for complete search history.

(56) References Cited

U.S. PATENT DOCUMENTS

| | | | |
|---|---|---|---|
| 4,939,746 A | 7/1990 | Childress | |
| 5,099,511 A | 3/1992 | Matsumoto | |
| 6,064,662 A | 5/2000 | Gitlin et al. | |
| 6,252,910 B1 | 6/2001 | West et al. | |
| 6,567,416 B1 | 5/2003 | Chuah | |
| 6,633,762 B1 | 10/2003 | Rauscher | |
| 6,856,812 B1 * | 2/2005 | Budka et al. | 455/522 |
| 6,885,630 B2 | 4/2005 | Kostic et al. | |
| 6,934,275 B1 | 8/2005 | Love et al. | |
| 7,016,319 B2 | 3/2006 | Baum et al. | |
| 7,200,405 B2 | 4/2007 | Rudolf et al. | |
| 7,664,091 B2 | 2/2010 | Batariere et al. | |
| 2001/0034209 A1 | 10/2001 | Tong et al. | |
| 2002/0029229 A1 | 3/2002 | Jakopac et al. | |
| 2002/0114401 A1 | 8/2002 | Kim et al. | |
| 2002/0118666 A1 | 8/2002 | Stanwood et al. | |
| 2002/0119781 A1 | 8/2002 | Li et al. | |
| 2002/0183066 A1 | 12/2002 | Pankaj | |
| 2003/0112778 A1 | 6/2003 | Lundby | |
| 2003/0189918 A1 | 10/2003 | Das et al. | |

(Continued)

FOREIGN PATENT DOCUMENTS

CN         1284798 A       2/2001

(Continued)

OTHER PUBLICATIONS

Scalable OFDMA Physical Layer in IEEE 802.16 Wirelessman; Intel Technology Journal; Aug. 20, 2004; 14 pages.

(Continued)

*Primary Examiner* — Brenda H Pham

(57) ABSTRACT

A method for scheduling a wireless communication entity based on channel quality information provided by the wireless entity, wherein scheduling is discontinued if channel quality information is not received from the wireless communication entity over a specified number of frames or if the channel quality information provided is insufficient to support a control channel. The wireless communication entity may discontinue reporting channel quality information if the channel quality measured over a specified number of frames is below a threshold. Scheduling may be discontinued by blocking, removing or preempting the scheduling of the wireless entity.

18 Claims, 6 Drawing Sheets

U.S. PATENT DOCUMENTS

| | | | |
|---|---|---|---|
| 2004/0087320 A1 | 5/2004 | Kim et al. | |
| 2004/0095907 A1 | 5/2004 | Agee et al. | |
| 2005/0047387 A1 | 3/2005 | Frederiksen et al. | |
| 2005/0111397 A1 | 5/2005 | Attar et al. | |
| 2005/0232181 A1 | 10/2005 | Park et al. | |
| 2006/0050742 A1 | 3/2006 | Grandhi et al. | |
| 2006/0094432 A1 | 5/2006 | Chang et al. | |
| 2006/0245384 A1 | 11/2006 | Talukdar et al. | |
| 2007/0047474 A1 | 3/2007 | Anderson | |
| 2007/0058595 A1 | 3/2007 | Classon et al. | |
| 2007/0110104 A1 | 5/2007 | Sartori et al. | |
| 2007/0115796 A1* | 5/2007 | Jeong et al. | 370/203 |
| 2007/0165731 A1 | 7/2007 | Xiao et al. | |
| 2007/0211657 A1 | 9/2007 | McBeath et al. | |
| 2007/0214400 A1 | 9/2007 | Smith et al. | |
| 2008/0049669 A1 | 2/2008 | Lundby et al. | |
| 2008/0084845 A1 | 4/2008 | Kuchibhotla et al. | |
| 2008/0084853 A1 | 4/2008 | Kuchibhotla et al. | |
| 2008/0085716 A1 | 4/2008 | Chang et al. | |
| 2008/0085718 A1 | 4/2008 | Kuchibhotla et al. | |
| 2009/0268695 A1 | 10/2009 | Zhao et al. | |

FOREIGN PATENT DOCUMENTS

| | | |
|---|---|---|
| CN | 1592482 A | 3/2005 |
| CN | 1770917 A | 5/2006 |
| EP | 1638271 A1 | 3/2006 |
| JP | 11355195 A | 12/1999 |
| JP | 2006505219 A | 2/2006 |
| KR | 2003-0089517 A | 11/2003 |
| WO | 92/11716 A1 | 7/1992 |
| WO | 0241520 A2 | 5/2002 |
| WO | 0249305 A2 | 6/2002 |
| WO | 2004100569 A2 | 11/2004 |
| WO | 2004/105294 A2 | 12/2004 |
| WO | 2005050852 A2 | 6/2005 |
| WO | 2005109705 A1 | 11/2005 |
| WO | 2006034401 A2 | 3/2006 |
| WO | 2006039812 A1 | 4/2006 |
| WO | 2006065069 A1 | 6/2006 |
| WO | 2006102746 A1 | 10/2006 |
| WO | 2006105004 A2 | 10/2006 |
| WO | 2006105005 A2 | 10/2006 |

OTHER PUBLICATIONS

R1-060378; E-UTRA Downlink Control Channel Structure and TP; 3GPP TSG RAN1 #44; Denver USA; Motorola; Feb. 13-17, 2006; 7 pages.

R1-050590; Physical Channels and Multiplexing in Evolved UTRA Downlink; 3GPP TSG RAN WG1 Ad Hoc on LTE; Sophia Antipolis, France; Jun. 20-21, 2005; 24 pages.

Harri Holma, Antti Toskala; WCDMA for UMTS; 2000, Wiley and Sons; XP002537677; pp. 95-97.

Lee et al., "Extended rtPS for VoIP services" Nov. 4, 2004, IEEE 802.16 Broadband Wireless Access Working Group <http://ieee802.org/16>, IEEE C802.16e-04/522, 8 pages.

U.S. Appl. No. 11/538,771; counterpart PCT Application No. PCT/US2007/076468; Search Report Jun. 11, 2008.

3GPP TS 36.211v8.7.0 (May 2009) "3rd Generation Partnership Project; Technical Specification Group Radio Access Network; Evolved Universal Terrestrial Radio Access (E-UTRA); Physical Channels and Modulation (Release 8)" 83 pages.

U.S. Appl. No. 11/538,758; counterpart PCT Application No. PCT/US2007/076477; International Search Report Feb. 1, 2008.

U.S. Appl. No. 11/538,758; Non-Final Office Action; Jul. 23, 2009.

U.S. Appl. No. 11/538,758; counterpart EPO Application No. 09007847.8; International Search Report; Aug. 4, 2009.

U.S. Appl. No. 11/538,758; counterpart EPO Application No. 09007846.0; International Search Report; Aug. 5, 2009.

U.S. Appl. No. 11/538,758; counterpart EPO Application No. 07814333.6; Exam Report; Aug. 19, 2009.

3GPP TSG RAN2#55; RS-062970 "Downlink Resource Allocation" Motorola, Seoul, Korea, Oct. 9-13, 2006; 2 pages.

Patent Cooperation Treaty, "PCT Search Report and Written Opinion of the International Searching Authority" for International Application No. PCT/US2007/074064 Mar. 14, 2008, 19 pages.

3GPP TSG RAN1#45, Shanghai, China, May 8-12, 2006; EUTRA Downlink Distributed Multiplexing and Mapping Rules TP; R1-061173; XP007903801.

United States Patent and Trademark Office, "Non-Final Rejection" for U.S. Appl. No. 11/466,720 Jun. 29, 2009, 17 pages.

Japanese Patent Office, "Notification of Reasons for Rejection" for Application No. 2007-216057 Nov. 27, 2009, 5 pages.

United States Patent and Trademark Office, "Final Rejection" for U.S. Appl. No. 11/466,720 Apr. 5, 2010, 18 pages.

United States Patent and Trademark Office, "Non-Final Rejection" for U.S. Appl. No. 11/466,720 Feb. 2, 2011, 29 pages.

Intel Technology Journal, vol. 08, Issue 03 "IEEE 802.16 Medium Access Control and Service Provisioning" Published, Aug. 20, 2004, 96 pages.

European Patent Office, "Extended European Search Report" for International Application No. 11170222.1-2412 Aug. 11, 2011, 13 pages.

The Federal Service for Intellectual Property, Patents and Trade Marks, "Decision on Grant Patent for Invention" for Russian Application No. 2009110200/08 date Jun. 24, 2011, 5 pages.

United States Patent and Trademark Office, "Non-Final Rejection" for U.S. Appl. No. 11/052,700 dated Jul. 28, 2011, 10 pages.

Korean Intellectual Property Office "Non-Final Rejection" for Application No. 10-2009-7009127 Aug. 9, 2011, 02 pages.

European Patent Office, "Extended European Search Report" for International Application No. 11157378.8-2412 Jul. 22, 2011, 13 pages.

The Intellectual Property Office of the People's Republic of China, "Notice of the First Office Action" for Application No. 200780040923.8, dated Oct. 10, 2011, 17 pages.

* cited by examiner

SCHEDULING REMOTE UNITS IN WIRELESS COMMUNICATION SYSTEMS

FIELD OF THE DISCLOSURE

The present disclosure relates generally to wireless communications and, more particularly, to scheduling wireless communication devices in wireless communication systems, for example, in cellular communication networks, corresponding entities and methods.

BACKGROUND

Time division multiplexing (TDM) and frequency division multiplexing (FDM) methods, including hybrids thereof, have been proposed for scheduling in the Third Generation Partnership Project (3GPP) Long Term Evolution (LTE) of UMTS Terrestrial Radio Access (UTRA) and UTRA Network (UTRAN) specifications.

Generally a scheduling entity in the wireless communication network infrastructure allocates or assigns radio resources to remote units in corresponding serving areas or cells or sectors of the network. In multiple access schemes such as those based on OFDM methods and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler based on a channel quality indicator (CQI) or other metric provided to the scheduler.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
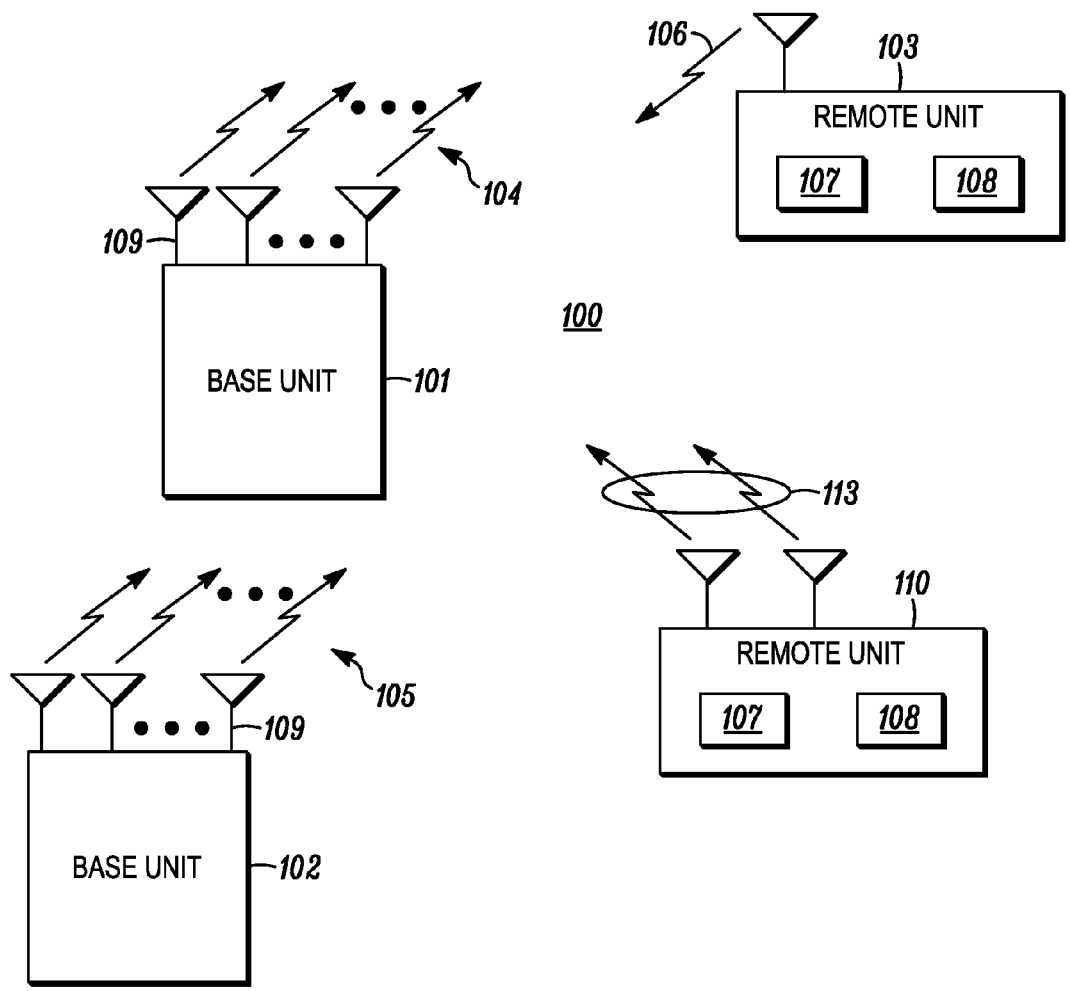
FIG. 1 illustrates a wireless communication system.

FIG. 1 illustrates a wireless communication system 100 comprising multiple cell serving base units forming a network distributed over a geographical region. A base unit may also be referred to as an access point, access terminal, Node-B, or by other terminology known in the art. The one or more base units 101 and 102 serve a number of remote units 103 and 110 within a serving area or cell or within a sector thereof. The remote units may also be referred to as subscriber units, mobile units, users, terminals, subscriber stations, user equipment (UE), user terminals or by other terminology known in the art. The network base units communicate with remote units to perform functions such as scheduling the terminals to receive or transmit data using available radio resources. The wireless network also comprises management functionality including data routing, admission control, subscriber billing, terminal authentication etc., which may be controlled by other network entities, as is known generally by those having ordinary skill in the art.

In FIG. 1, the base units 101 and 102 transmit downlink communication signals 104 and 105 to serving remote units on at least a portion of the same resources (time and/or frequency). Remote units 103 and 110 communicate with one or more base units 101 and 102 via uplink communication signals 106 and 113. The one or more base units may comprise one or more transmitters and one or more receivers that serve the remote units. The number of transmitters at the base unit may be related, for example, to the number of transmit antennas 109 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, all base units co-located together to serve a cell can constitute what is traditionally known as a base station. The remote units may also comprise one or more transmitters and one or more receivers. The number of transmitters may be related, for example, to the number of transmit antennas at the remote unit.

In one embodiment, the communication system utilizes OFDMA or a next generation single-carrier based FDMA architecture for uplink transmissions, such as interleaved FDMA (IFDMA), Localized FDMA (LFDMA), DFT-spread OFDM (DFT-SOFDM) with IFDMA or LFDMA. In other embodiments, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques.

Generally, a wireless communication network infrastructure scheduling entity located, for example, at each base unit 101 and 102 in FIG. 1, allocates or assigns radio resources to remote units in the network. In cellular communication networks, each base unit includes a scheduler for scheduling and allocating resources to remote units in corresponding serving areas or cells or sectors. In some embodiments, each remote unit is scheduled based on a frequency band channel quality indicator (CQI) or other metric provided to the scheduling entity. In multiple access schemes such as those based on OFDM methods and the Long Term Evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler.

In OFDM systems or OFDM-like systems such as DFT-SOFDM and IFDMA, a resource allocation is a frequency and time allocation that maps information for a particular base unit to sub-carrier resources from a set of available sub-carriers as determined by the scheduler. This allocation may depend, for example, on the frequency-selective channel-quality indication (CQI) or on some other metric reported by the UE to the scheduler. The channel-coding rate and the modulation scheme, which may be different for different portions of the sub-carrier resources, are also determined by the scheduler and may also depend on the reported CQI or other metric. In code division multiplexed networks, the resource allocation is a code allocation that maps information for a particular base unit to sub-carrier resources from a set of available sub-carriers as determined by the scheduler.

Figure 2:
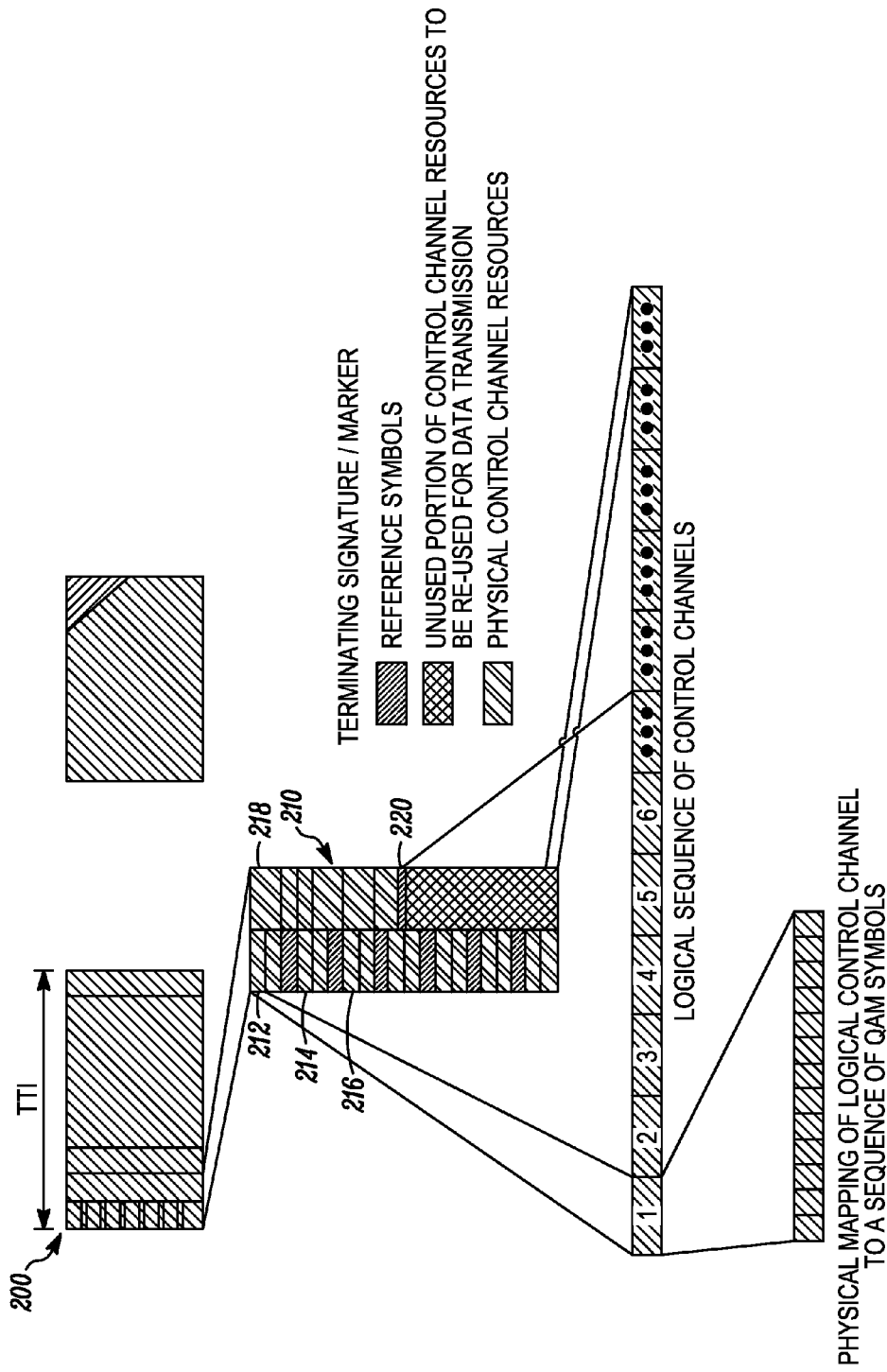
FIG. 2 illustrates a radio frame comprising a composite control channel having a plurality of control channel elements.

FIG. 2 illustrates a frame 200 that constitutes a portion of a radio frame. The radio frame generally comprises a plurality of frames, which may form a concatenated continuum of frames. In FIG. 2, each frame includes a composite control channel portion 210 comprising at least two control channel elements. FIG. 2 illustrates the composite control channel including a plurality of control channel elements 212, 214, 216 and 218. The control channel elements each comprise a codeword that provides a physical mapping of a logical control channel to a sequence of symbols, for example, QAM symbols. The control channel elements are generally not of the same type. In FIG. 2, for example, control channel elements 212 and 218 have different sizes. Control channel elements may also be for uplink or downlink assignments and have different associated information payload. Control channel elements may also be associated with different releases of the wireless communication protocol specification. In some embodiments, the composite control channel includes reference symbols, for example, pilot symbols, that are distinct from the control channel elements. The reference symbols are typically read by all remote units. The principles and teachings of the disclosure are applicable to the exemplary composite control channel and to other control channel structures.

Each frame corresponds to a transmission time interval (TTI). An exemplary TTI is 1 ms. In one embodiment, a single TTI has a length 1 ms or 2 ms wherein the TTI is segmented into two sub-frames each having a 0.5 ms length or a 1 ms length for the case of a 2 ms TTI. Furthermore, mechanisms are required to be able to assign resources based on the needs of an individual UE, wherein fewer resources are assigned for a UE served smaller packets while more resources are assigned to UE served with larger packets. In the case of a Universal Mobile Telecommunications System (UMTS), a TTI is defined as the length of time over which a transmission or transport block is transmitted. A transmission block or transport block is composed of a block of jointly coded data protected by a single cyclic redundancy check (CRC) code. In the present instance, an alternate definition of TTI could be the length of transmission controlled by a single instance of control channel signaling.

In one embodiment, each control channel element contains only radio resource assignment information, for example, a codeword, exclusively addressed to a single wireless communication entity, for example, one of the remote units 102, 103 in FIG. 1. The radio resource assignment information includes, among other remote unit specific information, a time-frequency radio resource assignment. In other embodiments, the radio resource assignment information may additionally comprise modulation, code rate, information block size, antenna mode indicator, and other information.

In one embodiment, a wireless communication device sends a Random Access Channel (RACH) message when a current channel quality indicator is greater than a first threshold and a previous average channel quality indicator is less than the first threshold. The device also sends a RACH message when the current channel quality indicator is greater than a first threshold and a previous average channel quality indicator is less than the first threshold. The wireless communication device sends CQI at a first rate if the current CQI is less than a second threshold and at a second rate if the current CQI is greater than the second threshold when the previous average CQI is greater than the first threshold.

Figure 3:
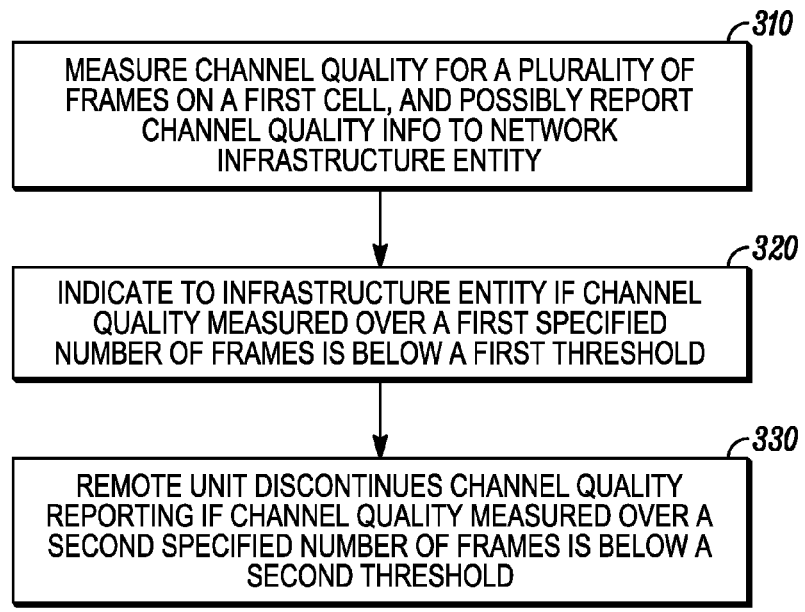
FIG. 3 illustrates a process flow diagram.
Figure 4:
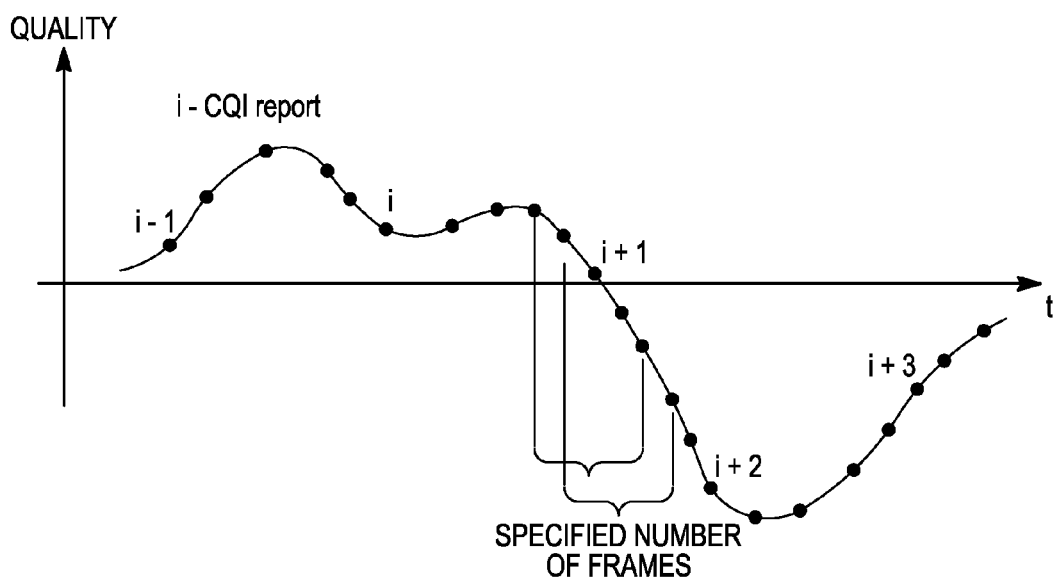
FIG. 4 illustrates a channel quality plot versus time.

In FIG. 3, at 310, a wireless communication device, for example, remote unit 101 or 103 in FIG. 1, obtains channel quality measurements, for example, on a plurality of frames in a first cell. In some implementations, channel quality information (CQI) is reported to an infrastructure entity, for example, to a scheduler at the base unit 101 in FIG. 1. The remote unit sometimes uses the resources for CQI reporting to instead send scheduling requests for UL resources. Thus, in some embodiments, the reporting of channel quality information may sometimes include a scheduling request for uplink resources. In some embodiments, to reduce radio resource usage, the remote unit does not report channel quality information for every frame measured. In FIG. 4, for example, the remote unit reports CQI every few frames, i−1, i, i+1, i+2, i+3 . . . i+n, wherein intermediate channel quality measurements are not reported.

In one embodiment, the remote unit determines whether the channel quality measured over a specified number of frames, for example, over several contiguous frames, is below a threshold. The comparison may be based on an average of the measured CQI for the specified number of frames or based upon some other statistical metric related to the measured channel quality. In FIG. 4, for example, the remote unit determines whether the channel quality measured for 5 contiguous frames is below the threshold. Such measurements and comparisons may be made on a continuing or sliding basis. In FIG. 3, at 320, the remote unit reports an indication to the infrastructure entity if the channel quality measured over a specified first number of frames is below a first threshold. The indication sent by the remote unit may be indicative to the scheduler that the channel conditions are decreasing at a particular rate, for example, a relatively high rate compare to the rate that would be inferred by the channel quality reports otherwise sent by the remote unit. More generally, the scheduler may use this indication as a basis for determining whether to discontinue scheduling the remote unit.

In other embodiments the remote unit discontinues reporting channel quality information if the channel quality measured over a second specified number of frames is below a threshold. The determination of when or whether the channel quality is below the threshold for the specified number of frames may be based on an average of the measured CQI for the specified number of frames or based upon some other statistical metric related to the measured CQI over the specified number of frames or other time interval.

In FIG. 3, at 330, the remote unit discontinues reporting channel quality information if the channel quality measured over a second specified number of frames is below a second threshold. More generally, the reporting of an indicator when the channel quality is below the first threshold and the discontinuing of channel quality reporting when the channel quality is below the second threshold need not be used in combination, as illustrated in FIG. 3.

In one implementation, the threshold at which the indicator is sent is greater that the threshold at which channel quality reporting is discontinued. In FIG. 3, for example, the second threshold is less than the first threshold. In other implementations, however, the threshold at which the indicator is sent is the same as the threshold at which channel quality reporting is discontinued. In either implementation, the second specified number of frames may be the same as or different than the first specified number of frames. In one particular implementation, for example, the first and second thresholds are the same and the second specified number of frames is greater than the first specified number of frames.

Figure 5:
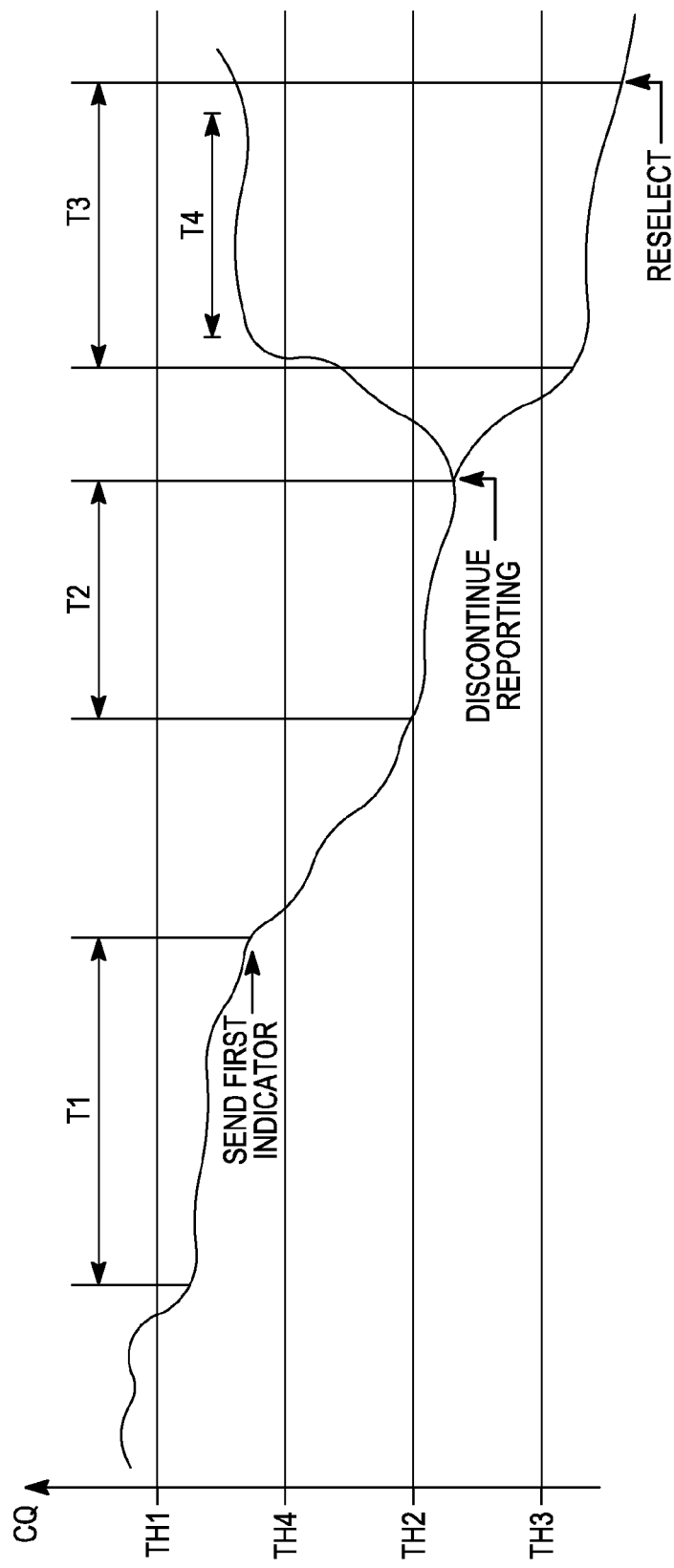
FIG. 5 illustrates another channel quality plot.

FIG. 5 illustrates channel quality (CQ) below a first threshold (TH1) for a first time interval (T1). As discussed, in some embodiments, the remote unit transmits a first indicator to the network indicative of this event. FIG. 5 also illustrates the channel quality falling below a second threshold (TH2) for a second time interval (T2). In some embodiments, the remote unit discontinues reporting channel quality information when the channel quality remains below the second threshold for the second timer interval. In some other embodiments the remote unit also releases resources, for example, control channel resources, associated with the reporting of channel quality information. In situations where the remote unit releases control channel resources on which channel quality information was reported, the remote unit may send a message, for example, a random access message, indicating that channel quality information reporting is discontinued.

In some embodiments, the remote unit may request a cell change, for example, reselection or handoff, to another cell if the channel quality remains below a threshold for a period of time. The threshold for requesting handoff or reselection may correspond to the threshold which forms the basis for sending the indicator or it may correspond to the threshold which forms the basis for discontinuing reporting the channel quality information, as discussed further below. In FIG. 5, if the channel quality continues to deteriorate below a third threshold (TH3) for a third time interval (T3), the remote unit changes cells, for example, it reselect to a different cell.

In FIG. 5, if the channel quality increases above a fourth threshold (TH4) for a fourth time interval (T4), the remote unit resumes reporting channel quality information and may be rescheduled, depending on the state of its scheduling metric. In some embodiments, the remote unit transmits a second indication indicating that the channel quality has exceeded the fourth threshold for the fourth time interval. On receiving the second indication the network or base unit may then provide radio resources to the remote unit for sending channel quality information reports.

Figure 6:
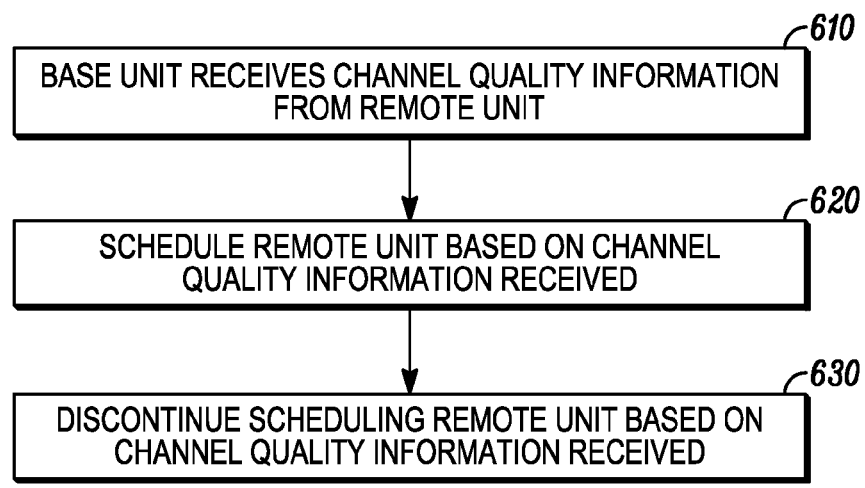
FIG. 6 illustrates another process flow diagram.

In FIG. 6, at 610, a wireless communication network infrastructure entity, for example, the base unit 101 in FIG. 1, receives channel quality information from the wireless communication entity or remote unit. At 620, in some embodiments, depending on the channel quality information received, the base unit schedules the remote unit based on the channel quality information received from the remote unit. In one embodiment, at 630, the scheduler discontinues scheduling the remote unit if channel quality information is not received from the remote unit, for example, in a specified number of frames, which may or may not be contiguous. For example, the scheduler may expect to receive channel quality information from the remote unit every $n^{th}$ frame. In one embodiment, radio resource usage is reduced by setting n>1. The scheduler may resume scheduling of the remote unit once channel quality information is again received from the remote unit.

In one embodiment, discontinuing scheduling includes blocking the scheduling of the remote unit until the channel quality information is deemed sufficient to resume its scheduling. A blocked remote unit is taken out of contention for scheduling because it is experiencing low channel quality. The blocked remote unit may be later placed in contention for scheduling upon resuming transmission of channel quality information. When blocked, the scheduler will generally continue to evolve a scheduling priority metric associated with the blocked remote unit while the remote unit is blocked. The scheduling metric is generally a function of channel quality and the time that has elapsed since the remote unit was last scheduled.

Figure 7:
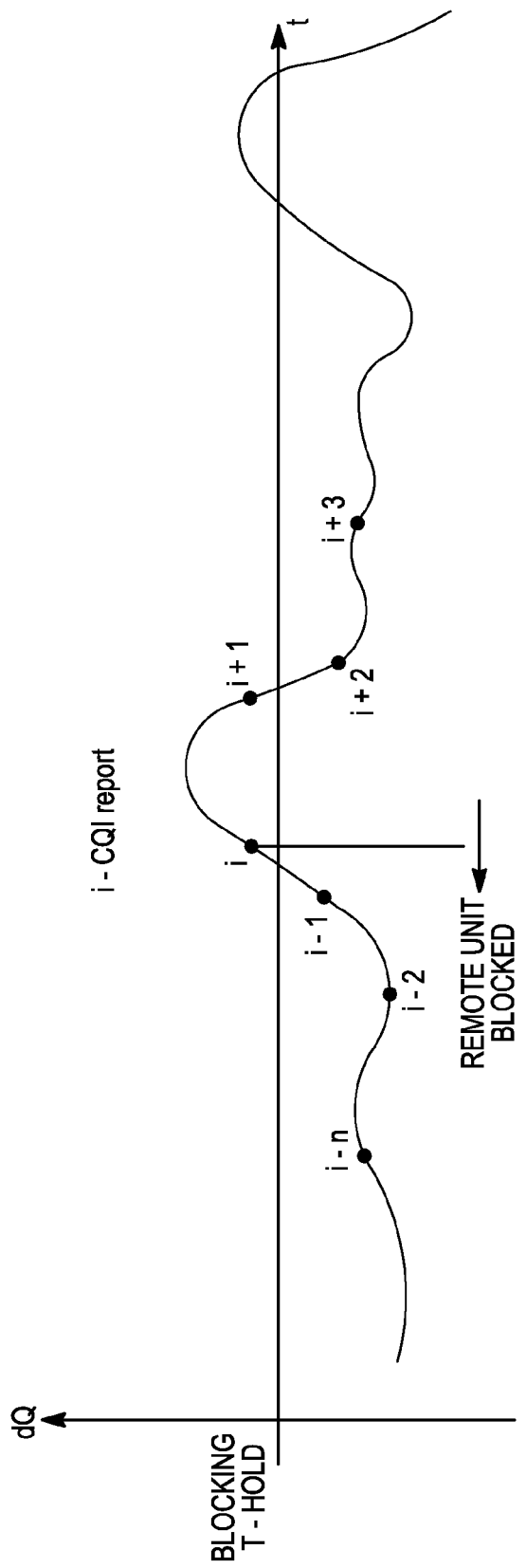
FIG. 7 illustrates another channel quality plot.

FIG. 7 illustrates the channel quality of the blocked remote relative to a blocking threshold. At instance i, the remote unit reports channel quality information above the threshold. In FIG. 7, the channel quality was below the threshold for reports made earlier in time, for example, at i−1, i−2 . . . . The channel quality at report i exceeds the blocking threshold, and thus the remote unit is in contention for scheduling based on its scheduling metric. In FIG. 7, because the remote unit has not been scheduled for some time, it will likely receive high priority for scheduling purposes at instance i.

In some embodiments, the infrastructure entity receives channel quality information from a remote unit, and blocks scheduling of the remote unit based on the channel quality information received from the remote unit. The scheduler may or may not schedule the remote unit, depending on its scheduling metric. The scheduler however will continue to evolve the scheduling priority metric associated with the blocked remote unit. The remote unit may be unblocked when its channel quality is sufficient for scheduling, whereupon the scheduler may allocate resources conditioned on the scheduling metric of the remote unit.

In another embodiment, the wireless communication network infrastructure entity receives channel quality information from a remote unit for scheduling the remote unit based on the channel quality information received from the remote unit. According to this embodiment, the scheduling entity discontinues scheduling the remote unit if the remote unit's channel quality information is insufficient to support a control channel. In one embodiment, scheduling is discontinued by removing the remote unit from consideration for scheduling in a particular transmission time interval (TTI) where its associated control channel cannot be supported due to lack of available control channel resources. The remote unit's remove state is revisited for each TTI during scheduling and the state (removed or not removed) is conditioned on available control channel resources as well as the control channel resource requirements of each scheduling candidate based on their respective channel quality. The total control channel resources are shared among the number of remote units considered for scheduling for a TTI (i.e., scheduling candidates).

In some instances, scheduling of the remote unit is discontinued due to a decision to remove it from scheduling such that the removed remote unit is preempted for scheduling by scheduling another remote unit in its place. The remote unit which preempts the removed remote unit is usually chosen due to its better fit with the other scheduled remote units in terms of control channel resource requirements. Therefore, preemption occurs when another remote unit is scheduled for a particular transmission time interval instead of or in place of the preempted remote unit. The scheduling priority metric of the removed or preempted remote unit generally continues to evolve during removal or preemption. The scheduling priority metric would generally not be reset on removal, preemption or blocking. In some implementations, the scheduling priority metric evolution of a removed, preempted or blocked remote unit is accelerated.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:
1. A method in a wireless communication device, the method comprising:
 measuring, at the wireless communication device, and reporting channel quality for a plurality of frames on a first cell;

transmitting, from the wireless communication device, a first indication if the channel quality measured over a first specified number of frames is below a first threshold;

discontinuing reporting channel quality information if the channel quality measured over a second specified number of frames is below a second threshold.

2. The method of claim 1, wherein discontinuing reporting includes releasing control channel resources on which channel quality information was reported.

3. The method of claim 1, transmitting a second indication when the channel quality exceeds a fourth threshold for a fourth specified number of frames.

4. The method of claim 1, further comprising requesting reselection to another cell if the channel quality remains below the second threshold for a period of time.

5. The method of claim 1, discontinuing reporting includes sending a random access message indicating that channel quality information reporting shall be discontinued and releasing a control channel resource on which channel quality information was reported.

6. The method of claim 1, where reporting channel quality information includes a scheduling request for uplink resources.

7. The method of claim 1, wherein the first and second thresholds are the same, and wherein the second specified number of frames is greater than the first specified number of frames.

8. The method of claim 1, changing to a second cell if the channel quality measured over a third specified number of frames on the first cell is below a third threshold.

9. The method of claim 8, wherein the first, second and third thresholds are the same, and wherein the second specified number of frames is greater than the first specified number of frames and the third specified number of frames is greater than the second specified number of frames.

10. A wireless communication device comprising:
a transceiver,
the wireless communication device configured to measure channel quality for a plurality of frames on a first cell,
wireless communication device configured to transmit a first indication if the channel quality measured over a first specified number of frames is below a first threshold, and
the wireless communication device configured to discontinue reporting channel quality information if the channel quality measured over a second specified number of frames is below a second threshold.

11. The device of claim 10, the wireless communication device configured to discontinue reporting by releasing control channel resources on which channel quality information was reported.

12. The device of claim 10, the wireless communication device configured to transmit a second indication when the channel quality exceeds a fourth threshold for a fourth specified number of frames.

13. The device of claim 10, the wireless communication device configured to request reselection to another cell if the channel quality remains below the second threshold for a period of time.

14. The device of claim 10, the wireless communication device configured to discontinue reporting by sending a random access message indicating that channel quality information reporting shall be discontinued and releasing a control channel resource on which channel quality information was reported.

15. The device of claim 10, where reporting channel quality information includes a scheduling request for uplink resources.

16. The device of claim 10, wherein the first and second thresholds are the same, and wherein the second specified number of frames is greater than the first specified number of frames.

17. The device of claim 10, the wireless communication device configured to change to a second cell if the channel quality measured over a third specified number of frames on the first cell is below a third threshold.

18. The device of claim 17, wherein the first, second and third thresholds are the same, and wherein the second specified number of frames is greater than the first specified number of frames and the third specified number of frames is greater than the second specified number of frames.

* * * * *